Patented Apr. 4, 1933

1,903,287

UNITED STATES PATENT OFFICE

HENRY L. COX, OF SOUTH CHARLESTON, WEST VIRGINIA, ASSIGNOR TO CARBIDE AND CARBON CHEMICALS CORPORATION, A CORPORATION OF NEW YORK

CORROSION INHIBITOR

No Drawing.  Application filed April 25, 1932.  Serial No. 607,507.

My invention relates to the protection of metals from corrosion by water and aqueous solutions. More specifically it refers to a new and useful group of compounds which, I have discovered, inhibit the corrosion of iron by aqueous fluids.

The chief object of my invention is to provide a new and useful corrosion inhibitor which is effective in small concentrations to protect iron in contact with water or solutions of monohydric and polyhydric alcohols in such devices for instance as fluid cooling systems, shock absorbers, and hydraulic lifts.

I have found that the addition of a small amount of morpholine, or a soluble substitution product thereof, to water or aqueous alcoholic solutions will effectively prevent corrosion of iron by the fluid.

The fluids with which my inhibitor may be used include water and aqueous solutions containing at least one alcohol. The term alcohol as used in this specification and the appended claims, includes all the liquid saturated aliphatic hydroxy compounds. The compounds of this class which have been used extensively in fluid media for heat-transfer and fluid-pressure transmission are the monohydroxy alcohols, such as methanol, ethanol, propanol, isopropanol, and the polyhydroxy alcohols such as glycols, especially of the 1.2 type, for example ethylene glycol, propylene glycol, diethylene glycol, triethylene glycol, and higher polyhydroxy alcohols such as glycerol.

The effective inhibitors of my invention include morpholine, alkyl substitution products of morpholine such as dimethyl morpholine, and hydroxyalkyl substitution products of morpholine such as ethanol morpholine.

Experiments which I have made demonstrate that the corrosion inhibiting compounds of my discovery are effective in very low concentrations. For example, a sample of iron was boiled in water in the presence of air for 24 hours; this treatment resulted in a severe corrosion of the iron. A similar iron sample was boiled in water which contained about 0.2% by weight of morpholine, in the presence of air; even after boiling for 24 hours this sample was perfectly clean, indicating that the presence of the morpholine effectively prevented corrosion of the iron.

In another series of tests I discovered that the addition of about 0.2% of morpholine to a solution of glycols effectively prevented corrosion of iron samples by the boiling solution.

Further tests demonstrated that substituted morpholines, such as dimethyl morpholine and ethanol morpholine have inhibiting properties similar to morpholine.

My invention therefore provides a new class of corrosion inhibitors comprising morpholine and substituted morpholines. Further, it provides a new non-corrosive fluid medium for use in fluid heat-exchange devices such as the cooling systems for internal combustion engines, and in fluid pressure-transmitting devices such as shock absorbers and hydraulic lifts, the said fluid comprising an aqueous solution of morpholine or a substituted morpholine, with or without added monohydroxy and/or polyhydroxy alcohol as a freezing point depressant. Also, my invention provides a non-corroding heat-exchange device comprising a metal heat exchanger, such as a radiator, in combination with the above-mentioned non-corrosive fluid, and a non-corroding fluid-pressure device comprising a metal shock-absorber or hydraulic lift in combination with the non-corrosive fluid. Still further, the invention includes a process for inhibiting, minimizing or substantially decreasing the corrosion of iron by water or an aqueous solution of alcohol in contact with the iron, which comprises contacting the water or aqueous solution of alcohol in the presence of an inhibitor consisting of morpholine, a substitution product thereof, or mixtures of those compounds.

I claim:

1. Fluid medium suitable for use in heat-exchange devices and pressure-transmitting devices comprising an aqueous solution containing at least one corrosion inhibitor chosen from the group consisting of morpholine and substituted morpholines.

2. Fluid medium suitable for use in heat-exchange devices and pressure-transmitting devices comprising an aqueous solution containing at least one alcohol and at least one corrosion inhibitor chosen from the group consisting of morpholine, the alkyl substitution products of morpholine, and the hydroxyalkyl substitution products of morpholine.

3. Fluid medium suitable for use in heat-exchange devices and pressure-transmitting devices comprising an aqueous solution containing at least one alcohol and at least one corrosion inhibitor chosen from the group consisting of morpholine, dimethyl morpholine, and ethanol morpholine.

4. Fluid heat-transfer medium comprising an aqueous solution containing at least one alcohol chosen from the group consisting of methanol, ethanol, propanol, isopropanol, glycol, ethylene glycol, propylene glycol, diethylene glycol, triethylene glycol, glycerol, and at least one corrosion inhibitor chosen from the group consisting of morpholine, dimethyl morpholine and ethanol morpholine.

5. Heat-exchange device comprising in combination with a radiator an aqueous solution containing a corrosion inhibitor chosen from the group consisting of morpholine and substituted morpholines.

6. Heat-exchange device comprising in combination with a metal radiator an aqueous solution containing an alcohol and a corrosion inhibitor chosen from the group consisting of morpholine, the alkyl substitution products of morpholine and the hydroxyalkyl substitution products of morpholine.

7. Method of inhibiting the corrosion of iron by an aqueous fluid in contact therewith which comprises adding to said fluid at least one compound chosen from the group consisting of morpholine, the alkyl substitution products of morpholine and hydroxyalkyl substitution products of morpholine.

8. A process for decreasing the corrosion of iron by an aqueous solution of alcohol in contact therewith, which comprises contacting the said solution with iron in the presence of at least one compound chosen from the group consisting of morpholine, the alkyl substitution products of morpholine, and the hydroxyalkyl substitution products of morpholine.

In testimony whereof, I affix my signature.

HENRY L. COX.